United States Patent
Tanaka et al.

(10) Patent No.: US 6,330,066 B1
(45) Date of Patent: Dec. 11, 2001

(54) HEIGHT MEASURING APPARATUS AND METHOD AND TESTING APPARATUS USING THE HEIGHT MEASURING APPARATUS

(75) Inventors: Minoru Tanaka, Tokyo; Kuniyoshi Takeuchi, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/572,835

(22) Filed: May 16, 2000

(30) Foreign Application Priority Data

May 20, 1999 (JP) .................................................. 11-140269

(51) Int. Cl.[7] ............................ G01B 11/24; G01B 11/02
(52) U.S. Cl. ........................ 356/609; 382/145; 382/151; 250/559.22; 356/624
(58) Field of Search ....................................... 356/376, 375; 250/201.7, 559.22, 559.29, 559.31, 201.2; 382/141, 154, 291, 152, 145, 146, 147, 149, 151; 348/94, 126

(56) References Cited

U.S. PATENT DOCUMENTS

| | | | |
|---|---|---|---|
| 4,707,610 | * 11/1987 | Lindow et al. | 356/376 |
| 5,151,609 | 9/1992 | Nakagawa. | |
| 5,305,092 | * 4/1994 | Mimura et al. | 356/376 |
| 5,448,360 | * 9/1995 | Wakai et al. | 356/376 |
| 5,543,918 | * 8/1996 | Abraham et al. | 356/376 |
| 5,780,866 | 7/1998 | Yamamura. | |

* cited by examiner

Primary Examiner—Hoa Q. Pham
(74) Attorney, Agent, or Firm—Ronald P. Kananen; Rader, Fishman & Grauer PLLC

(57) ABSTRACT

An imaging means, which is provided so as to be movable in a Z direction that is perpendicular to an object, images the object. A moving means moves the imaging means in the Z direction with adjustment. A control means measures a height of the object by causing the imaging means to image the object while causing the moving means to move the imaging means in the Z direction by a very small distance at a time, calculates focus values through image processing based on respective imaged pictures, and detects a focus position from a Z-direction variation of the focus values.

5 Claims, 10 Drawing Sheets

FOCUS VALUE WAVEFORM WITH
PIXEL-BY-PIXEL Z-AXIS MOVEMENT

FOCUS VALUE WAVEFORM WITH PIXEL-BY-PIXEL Z-AXIS
MOVEMENT AFTER LOW-PASS FILTER PROCESSING

OVERALL FOCUSED REGION

TESTING AREA

HEIGHT MEASURING APPARATUS AND METHOD AND TESTING APPARATUS USING THE HEIGHT MEASURING APPARATUS

BACKGROUND OF THE INVENTION

1. Field of the Invention

The present invention relates to a height measuring apparatus and method for measuring heights of an object for imaging such as electronic components as well as to a testing apparatus for testing an object and measuring its heights by using such a height measuring apparatus.

2. Description of the Prior Art

Conventionally, after electronic components have been mounted on a mounting circuit board, the mounting of the electronic components is tested visually according to the following method.

For example, as for a mounting circuit board 1, each electronic component to be tested is imaged by an imaging section 3 by using a lens 2 having a relatively high magnification as shown in FIG. 9A and is visually tested while an operator looking at an imaged picture taken by the imaging section 3 (see FIG. 9B).

In this case, since individual electronic components have different surface heights, the heights of the respective electronic components are detected by imaging the electronic components by using a separately provided measuring instrument such as a laser measuring instrument or by utilizing what is called an overall focusing method.

The overall focusing method is a method for obtaining an imaged picture that is in focus in the entire range by imaging the electronic components with the imaging section 3 while moving an imaging means, that is, the lens 2 and the imaging section 3, in the height direction with respect to the electronic components with a moving means by a very small distance at a time and then synthesizing a picture by picking up portions including in-focus components of imaged pictures at the respective heights.

This method allows recognition of the heights of the respective components based on the movement distances of the imaging section 3 that is moved by the moving means.

However, in recent years, the integration density of electronic components etc. has increased and a video camera has come to be used to test minute components visually.

As shown in FIGS. 10A and 10B, in the case of using a video camera 4 a lens 5 having a relatively small magnification and a large depth of field is used because a wide region of a mounting circuit board 1 needs to be tested. Therefore, in appearance a wide area is in focus and hence the above-mentioned overall focusing method cannot be utilized.

Therefore, the heights of the respective components cannot be measured simultaneously with testing. To measure the heights of the respective components, a separately provided height measuring instrument is needed. This causes a problem of increase in equipment cost.

OBJECT AND SUMMARY OF THE INVENTION

In view of the above, an object of the present invention is to provide a height measuring apparatus and method which make it possible to perform height measurement based on imaged pictures of an object member such as an electronic component as well as to a testing apparatus which makes it possible, by utilizing such a height measuring apparatus, to perform imaging and height measurement of an object member simultaneously.

According to a first aspect of the invention, there is provided a height measuring apparatus comprising imaging means provided so as to be movable in a Z direction that is perpendicular to an object, for imaging the object; moving means for moving the imaging means in the Z direction with adjustment; and control means for measuring a height of the object by causing the imaging means to image the object sequentially while causing the moving means to move the imaging means in the Z direction by a very small distance at a time, calculating focus values through image processing based on respective imaged pictures, and detecting a focus position from a Z-direction variation of the focus values.

According to a second aspect of the invention, there is provided a testing apparatus comprising imaging means provided so as to be movable in a Z direction that is perpendicular to an object, for imaging the object; moving means for moving the imaging means in the Z direction with adjustment; and control means for measuring a height of the object by causing the imaging means to image the object sequentially while causing the moving means to move the imaging means in the Z direction by a very small distance at a time, calculating focus values through image processing based on respective imaged pictures, and detecting a focus position from a Z-direction variation of the focus values, and for performing a shape test on the object by combining a plurality of imaged pictures of the object.

According to a third aspect of the invention, there is provided a height measuring method comprising a first step of imaging an object sequentially at individual movement positions with imaging means while moving the imaging means in a Z direction that is perpendicular to the object by a very small distance at a time; a second step of calculating focus values based on respective imaged pictures taken by the imaging means; a third step of detecting a focus position from a Z-direction variation of the focus values, and employing the focus position as a height of the object.

In the first and third aspects of the invention, in a case where a wide region of an object is to be imaged, the object is imaged at each position while the imaging means is moved in the Z direction by a very small distance at a time, whereby object imaging can be performed by utilizing what is called an overall focusing method.

The control means calculates focus values, for example, spatial frequencies, at respective positions by performing image processing on imaged pictures at the respective positions, detects a focus position based on a Z direction variation of the focus values, and employs the focus position as a Z direction height of the object.

Therefore, the height of the object can be measured based on imaged pictures of the object taken by the imaging means without the need for using a separately provided height measuring means.

Where the imaging means comprises a lens having a large depth of field, the invention makes it possible to measure the height of an object by detecting a focus position from a Z-direction variation of focus values that are calculated through image processing. This is in contrast to a conventional case where the use of such a lens disables measurement of the height of an object based on imaged pictures because of a wide focus range.

In the second aspect of the invention, similarly, in a testing apparatus which images an object and tests the object based on imaged pictures, the testing and height measurement of the object are performed simultaneously because the height of the object is measured by utilizing the imaged pictures for the testing.

The focus value is a numerical representation, such as a spatial frequency, of the degree of focusing of a focusing-attempted portion (hereinafter referred to as "focused region") of an object. A larger numerical value of the focus value means a high degree of focusing.

The spatial frequency is a quantity representing a spatial repetition frequency. In this case, a numerical value representing luminance per unit length is used as the spatial frequency.

DESCRIPTION OF THE PREFERRED EMBODIMENT

A preferred embodiment of the present invention will be hereinafter described in detail with reference to FIG. 1 to FIGS. 8A and 8B.

The embodiment described below includes various technically preferable limitations because it is a preferred embodiment of the invention. However, the scope of the invention is not limited to those limitative forms unless a statement to the effect that the invention is limited to a specific limitation is made in the following description.

Figure 1:
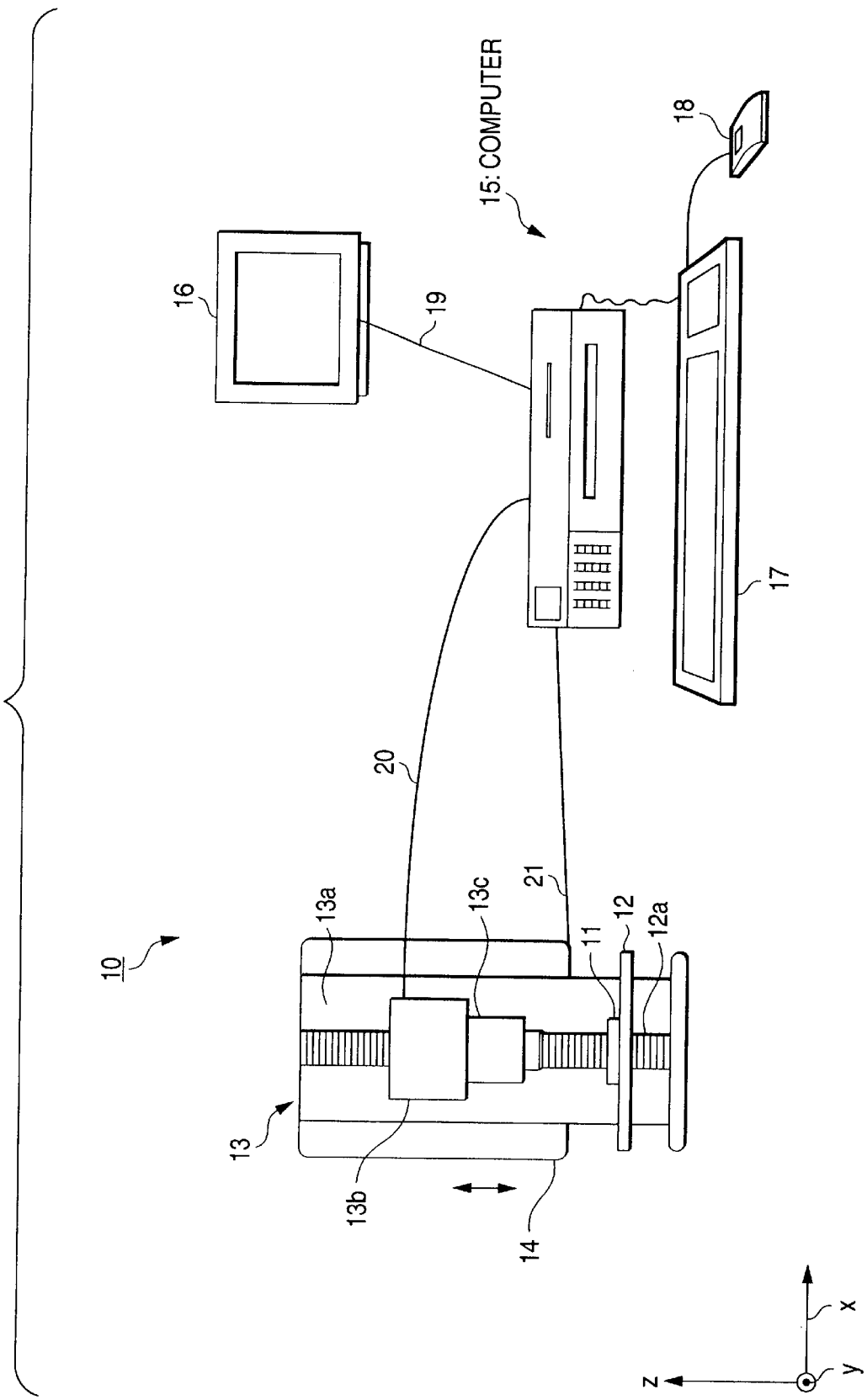
FIG. 1 is a schematic diagram showing the configuration of a testing apparatus having a height measuring apparatus according to an embodiment of the present invention.

FIG. 1 shows the configuration of a testing apparatus including a height measuring apparatus according to an embodiment of the invention.

As shown in FIG. 1, the testing apparatus 10 is equipped with a stage 12 on which an object 11 for imaging such as a mounting circuit board that is an object to be tested is placed, an imaging means 13 for imaging the object 11 placed on the stage 12 from above in the vertical direction (Z direction), a moving means 14 for moving, with adjustment, the imaging means 13 in the Z direction relative to the stage 12, and a computer 15 as a control means for controlling the stage 12, the imaging means 13, and the moving means 14 and for measuring heights of the object 11 based on an imaging signal sent from the imaging means 13.

Being, for example, a mounting circuit board that is mounted with electronic components etc., the object 11 have different surface heights in the Z direction (i.e., the top-bottom direction in FIG. 1).

The stage 12 is formed by a plate-like member, and the object 11 is placed on its flat top surface.

Figure 3A:
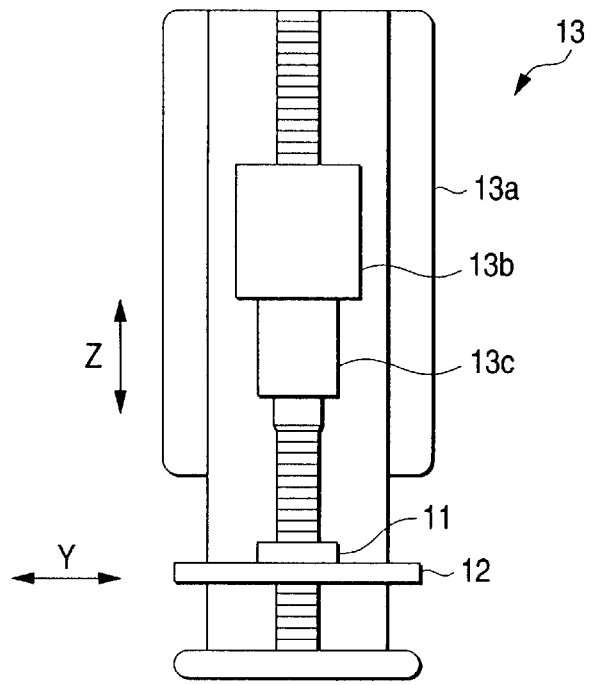
FIGS. 3A and 3B are a front view and a side view, respectively, showing a relationship between a stage and movement of an imaging means by a moving means in the testing apparatus of FIG. 1.
Figure 3B:
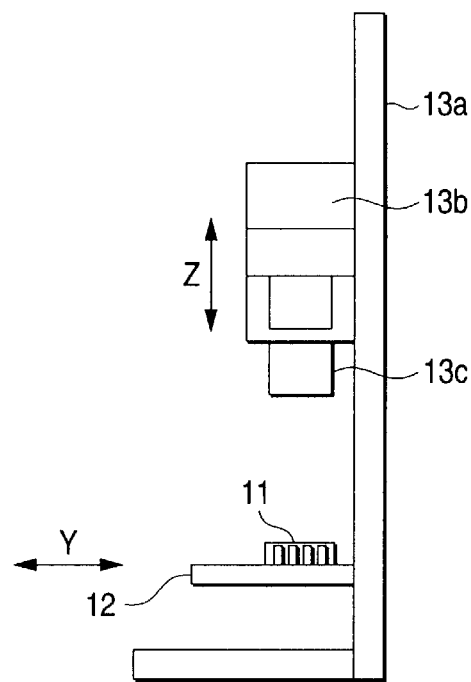

The stage 12 is so supported as to be movable in, for example, the two horizontal directions X and Y, and is moved, with adjustment, by a moving section 12a in the two horizontal directions, for example, in the X direction as shown in FIG. 3A and in the Y direction as shown in FIG. 3B.

For example, the imaging means 13 is composed of a video camera 13b that is attached to a camera stage 13a and an imaging lens 13c that is attached to the video camera 13b.

For example, in the case of FIGS. 3A and 3B, the moving means 14 supports the camera stage 13a so that it can be moved in the Z direction and moves, with adjustment, the camera stage 13a in the Z direction with a driving means (not shown) such as a stepping motor.

For example, the computer 15 has a function of measuring heights of the object 11 based on an imaging signal sent from the imaging means 13. The control means may be in another form as long as it can control the imaging means 13 and the moving means 14 and can measure heights of the object 11; for example, the control means may be a microprocessor.

For example, the computer 15 is equipped with a monitor 16 as a display means and a keyboard 17 and a mouse 18 as an input means.

Connected to the computer 15 via a monitor cable 19, the monitor 16 displays an imaged picture of the object 11 taken by the imaging means 13. The monitor 16 may be any of various display devices such as a CRT display and a liquid crystal display.

The computer 15 is connected to the video camera 13b of the imaging means 13 via a camera cable 20 and connected to the moving means 14 via a control cable 21 with an RS-232C interface, for example.

Figure 2:
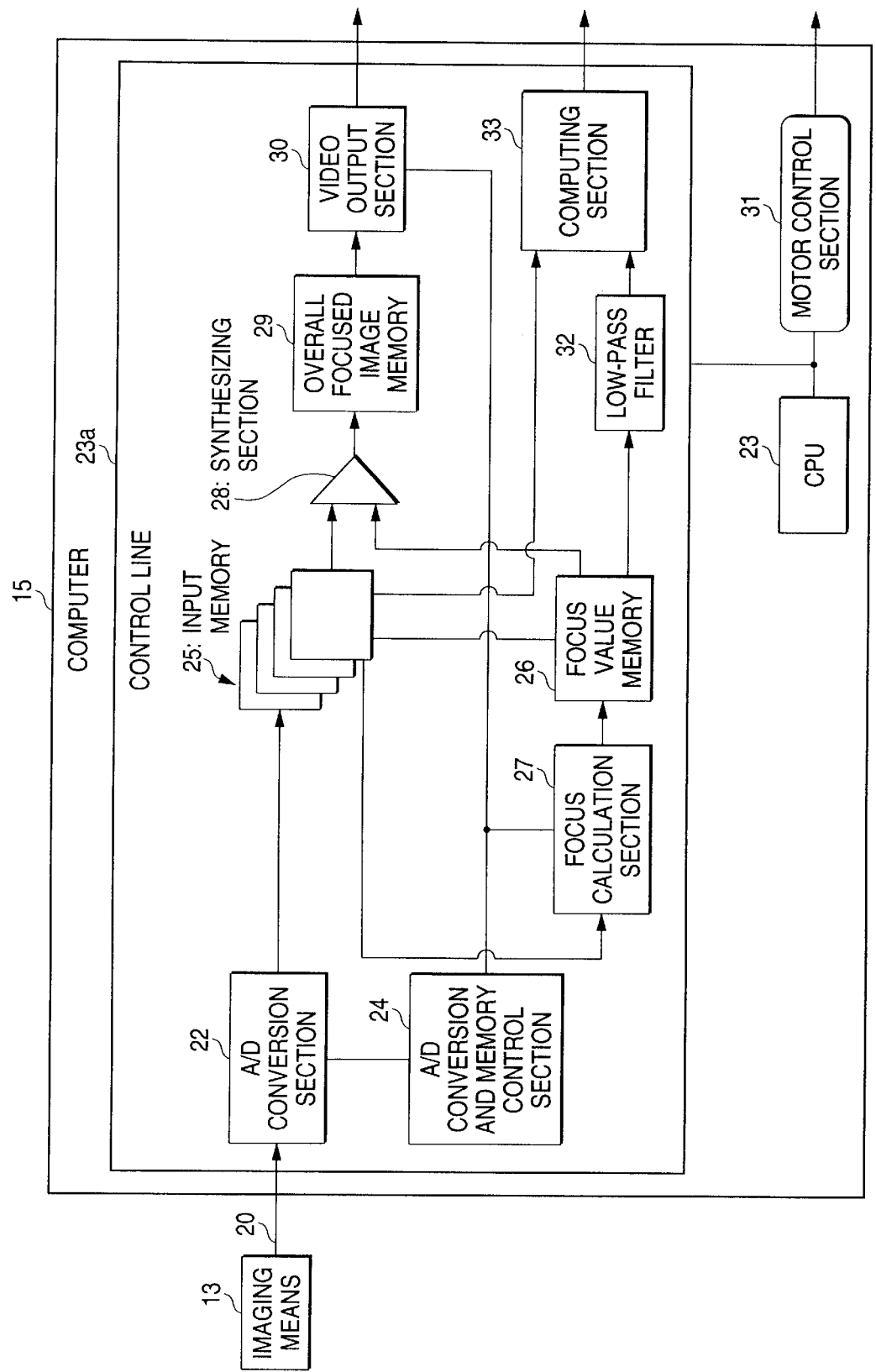
FIG. 2 is a block diagram showing an example internal configuration of a computer of the testing apparatus of FIG. 1.

FIG. 2 shows an example internal electrical configuration of the computer 15.

As shown in FIG. 2, for example, the computer 15 has an A/D (analog-to-digital) conversion section 22, a CPU 23, an A/D conversion and-memory control section 24, an input memory 25, a focus value memory 26, a focus value calculation section 27, a synthesizing section 28, an overall focused image memory 29, a video output section 30, a motor control section 31, a low-pass filter 32, and a computing section 33.

The A/D conversion section 22 is connected to the imaging means 13 via the camera cable 20 and connected to the focus value calculation section 27 via the input memory 25.

With this connection, the A/D conversion section 22 converts, into digital data, image data of an imaged picture that is analog data of the object 11 taken by the imaging means 13.

As shown in FIG. 2, the CPU 23 is connected, via a control line 23a, for example, to the input memory 25, the focus value calculation section 27, the focus value memory 26, the overall focused image memory 29, the A/D conversion and memory control section 24, the motor control section 31, and the video output section 30.

Being a central arithmetic and processing unit, for example, the CPU 23 controls the above-mentioned individual sections via the control line 23a.

The input memory 25 is a storage means for storing image data that is sent from the A/D conversion section 22. As described later, the input memory 25 also stores height information values that are Z-direction movement positions (distances) corresponding to respective stored images.

The focus value memory 26 is a means for storing focus values that are calculated by the focus value calculation section 27. The focus value memory 26 stores and holds maximum focus values before focus values are input from the focus value calculation section 27.

The synthesizing section 28 writes part of the image data stored in the input memory 25 that is judged to be associated with focus points to the overall focused image memory 29 from the focus value memory 26.

Therefore, the overall focused image memory 29 is a storage means for storing overall focused image data.

The video output section 30 stores data to be used for outputting the overall focused image data that is sent from the overall focused image memory 29.

Being controlled by the CPU 23, the motor control section 31 controls the operations of the moving means 14 and the moving section 12a of the stage 12 shown in FIG. 1.

Configured in the above-described manner, the testing apparatus 10 according to the embodiment measures heights of the object 11 in the following manner according to a flowchart shown in FIG. 4.

Figure 4:
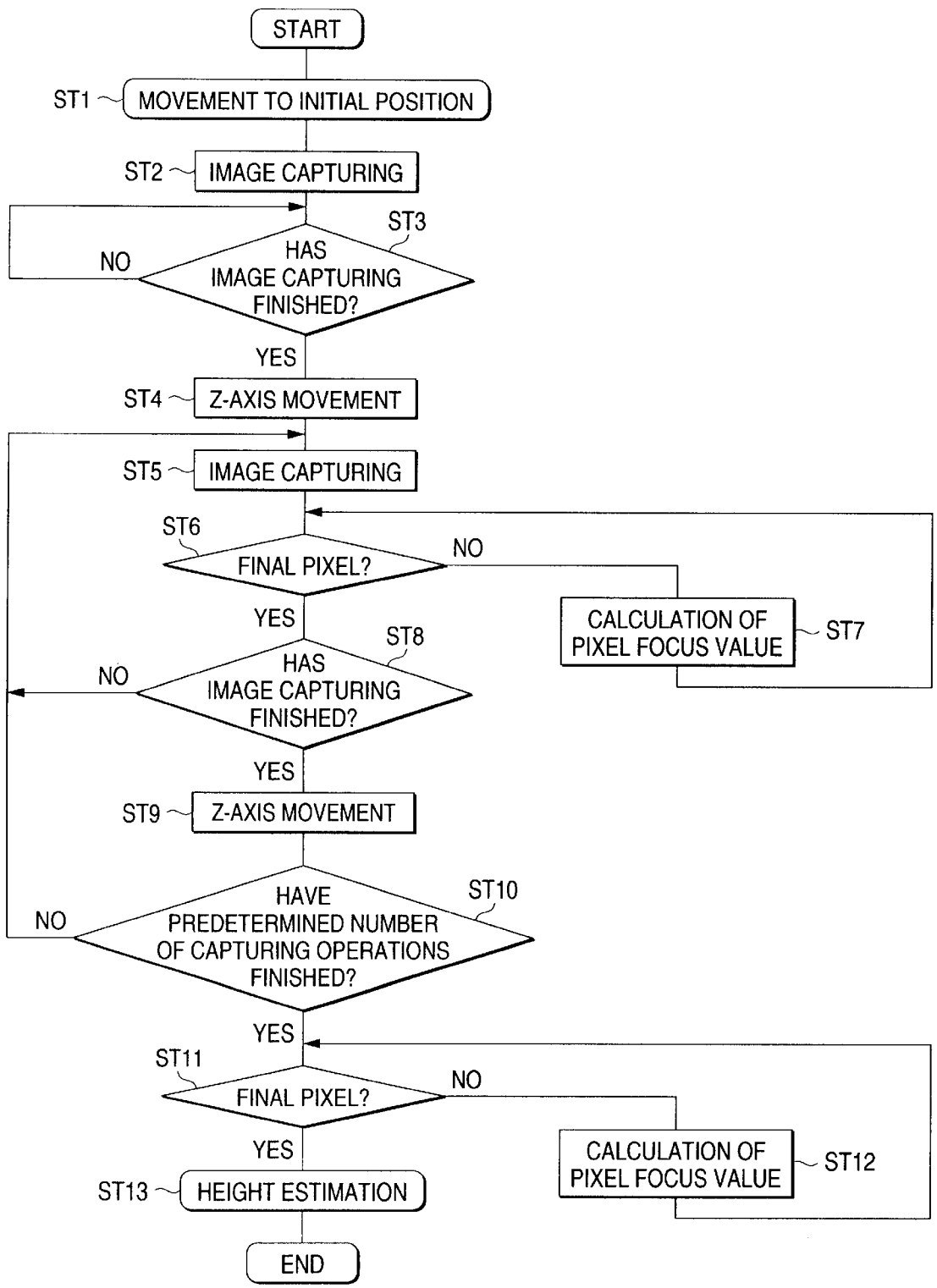
FIG. 4 is a flowchart of a height measurement process in the testing apparatus of FIG. 1.

Referring to the flowchart of FIG. 4, first, at step ST1, under the control of the computer 15 the moving means 14 moves the imaging means 13 to an initial position of imaging of the video camera 13b, for example, a defocused position Z1 that is most distant from the object 11.

Then, at step ST2, the imaging means 13 is controlled by the control of the computer 15 and the video camera 13b images the object 11 (i.e., captures an object image) at the position Z1. At this time, image data of the captured image is input from the A/D conversion section 22 of the computer 15 to the input memory 25 and stored there.

Then, if it is judged at step ST3 that the image capturing has finished, the process goes to step ST4, where under the control of the CPU 23 of the computer 15 the motor control section 31 drive-controls the moving means 14 to move the imaging means 13 in the Z direction by a very small distance.

Then, at step ST5, the imaging means 13 is controlled by the computer 15 and the video camera 13b captures an image of the object 11 at this movement position.

During the image capturing, the computer 15 judges at step ST6 whether the acquired pixel is the final pixel of the image data. If it is not the final pixel, at step ST7, the computer 15 stores the image data in the overall focused image memory 29, displays the captured image on the screen of the monitor 16 via the video output section 30, reads image data from the input memory 25, causes the focus value calculation section 27 to calculate a focus value of each pixel, and stores the calculated focus value and a height information value in the focus value memory 26. Then, the process returns to step ST6.

The height information value is positional information of the object 11 in the height direction Z, that is, the height between the video camera 13b and a region of the object 11 that is in focus.

If it is judged at step ST6 that the acquired pixel is the final pixel of the image data, the computer 15 judges at step ST8 that the image capturing at step ST5 has finished. At step ST9, to capture the next image, the computer 15 controls the moving means 14 and thereby moves the imaging means 13 in the Z direction toward the object 11 by a very small distance.

Then, the computer 15 judges at step ST10 whether a predetermined number of image capturing operations (i.e., image capturing operations at Z1–Zn) have finished. If the predetermined number of image capturing operations have not finished yet, steps ST5–ST9 are executed again.

Figure 5:
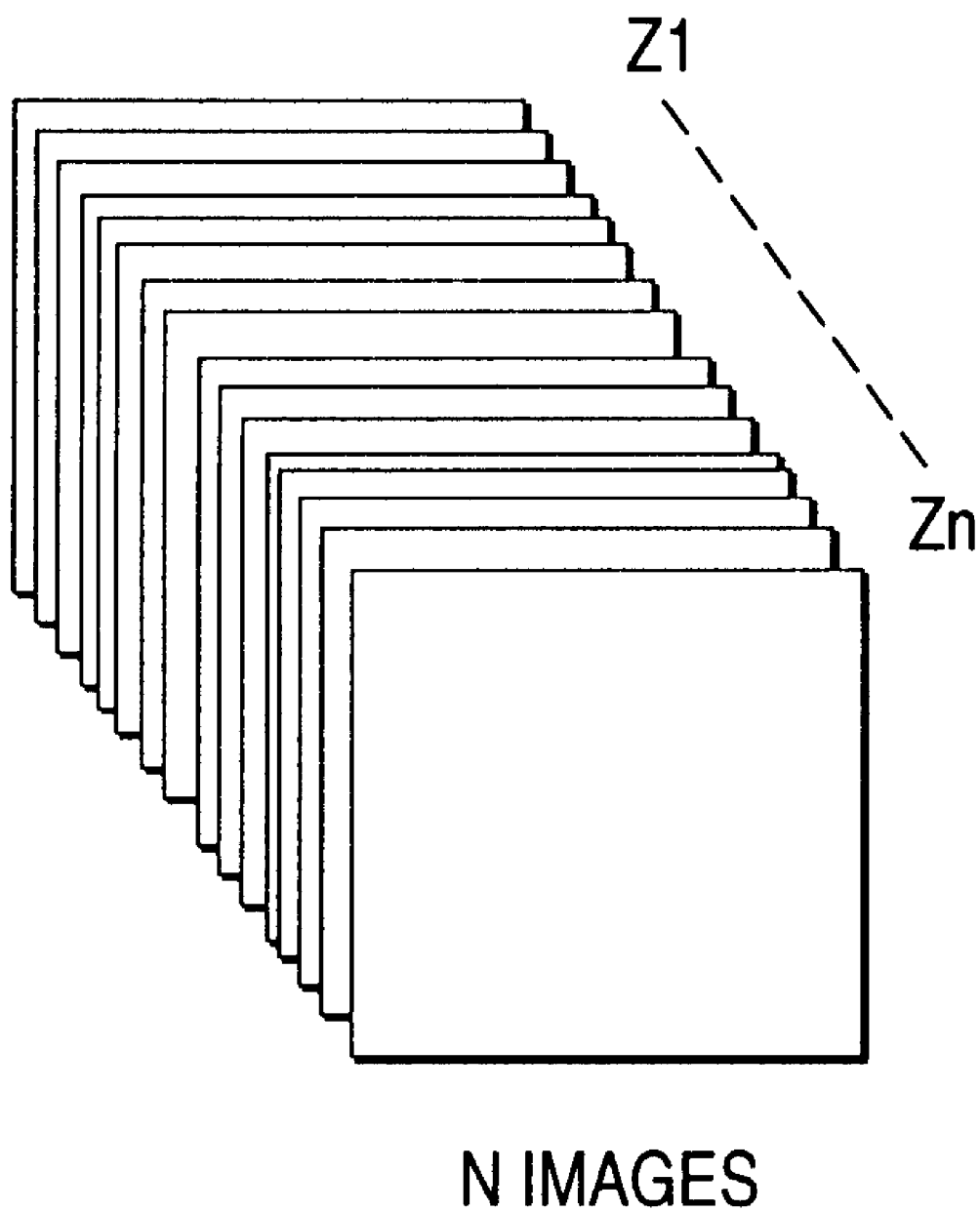
FIG. 5 is a schematic diagram showing a mutual positional relationship among imaged pictures that are taken while the imaging means is moved in the Z direction by a very small distance each time in the testing apparatus of FIG. 1.
Figure 6A:
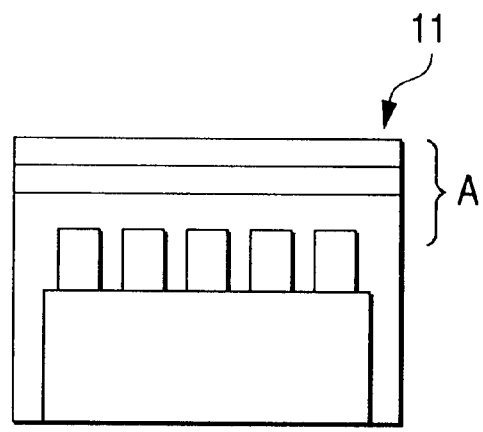
FIGS. 6A and 6B show a picture in which a circuit board surface is in focus and a picture in which a component surface is in focus among imaged pictures at respective positions.
Figure 6B:
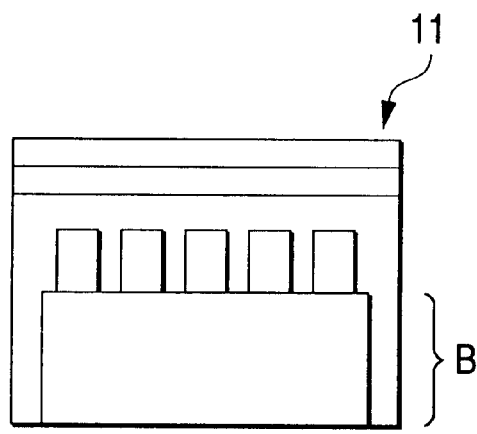

In this manner, n images are taken at the positions Z1–Zn as shown in FIG. 5 by moving the imaging means 13 in the Z direction relative to the object 11 by a very small distance at a time. In doing so, the images are displayed sequentially on the screen of the monitor 16. For example, as the focused region of the object 11 moves gradually, a real image in which only a region A is in focus as shown in FIG. 6A and a real image in which only a region B is in focus as shown in FIG. 6B are obtained.

Figure 6C:
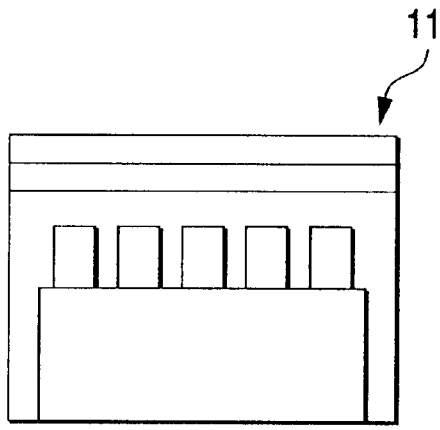
FIG. 6C shows a synthesized picture according to an overall focusing method in the testing apparatus of FIG. 1.

Therefore, by picking up a focused region from a real image at each of the positions Z1–Zn and causing the synthesizing section 28 to combine those regions, the computer 15 can generate a synthesized image that is in focus over the entire screen and produce an imaged picture according to what is called the overall focusing method as shown in FIG. 6C. Based on the synthesized image, the computer 15 can perform a shape test on the object 11.

If it is judged at step ST10 that the predetermined number of image capturing operations have finished, the computer 15 judges at step ST11 whether the pixel of the final image is the last pixel of the image data. If it is not the final pixel, the process goes to step ST12, where the computer 15 captures image data from the input memory 25, causes the focus value calculation section 27 to calculate a focus value of each pixel and stores the calculated focus value and a height information value in the focus value memory 26. Then, the process returns to step ST11.

If it is judged at step ST11 that the acquired pixel is the last pixel of the image data, at step ST13 the computer 15 detects, in a manner described below, a focus position from a Z-direction variation of the focus values based on the focus values and the height information values at the respective positions Z1–Zn that are stored in the focus value memory 26 and employs the detected focus position as a height of the object 11. The height measurement on the object 11 is thus completed.

Figure 7:
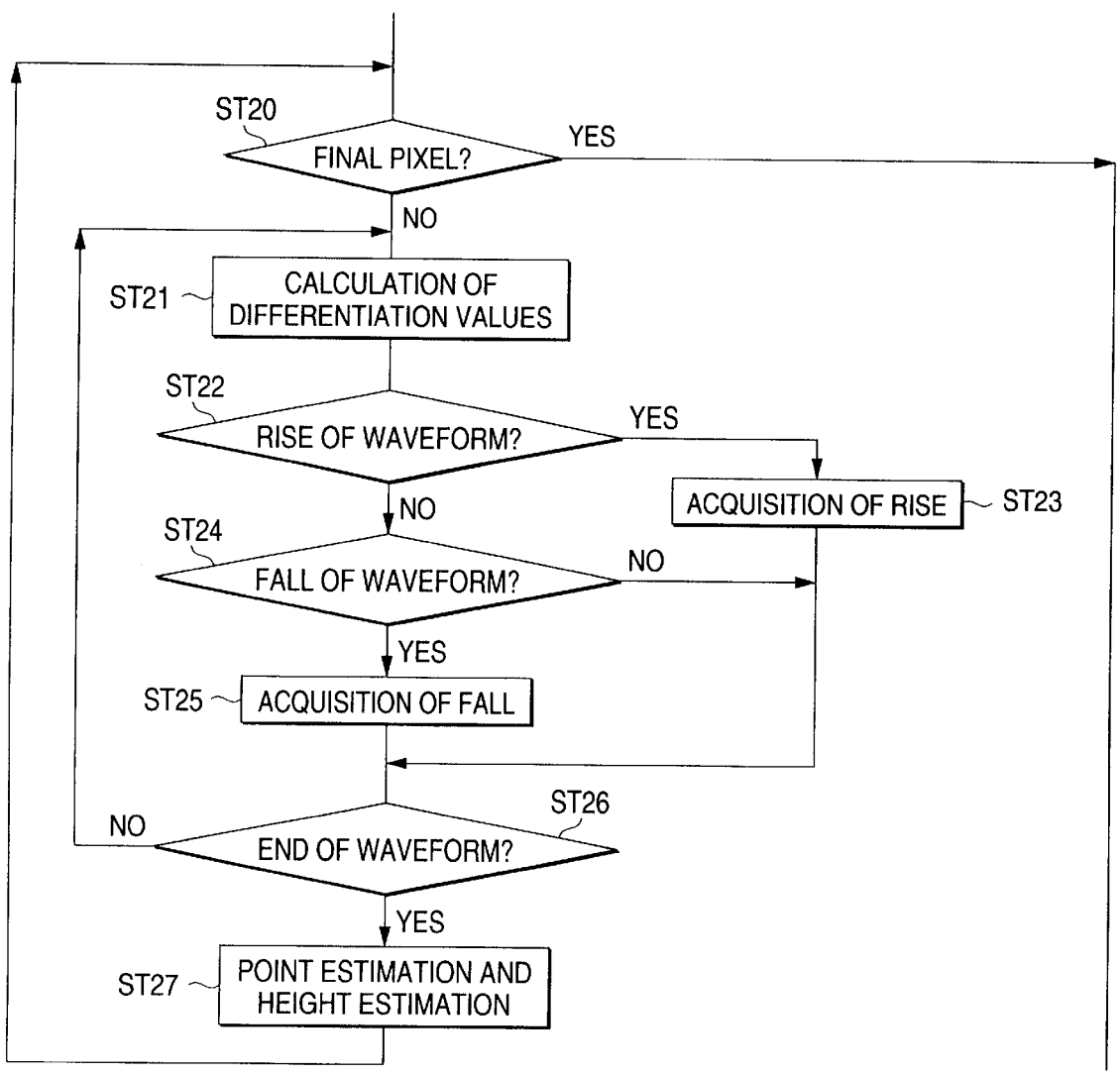
FIG. 7 is a flowchart of a process of determining a focus position from a focus value waveform in the testing apparatus of FIG. 1.

FIG. 7 shows a method for detecting a focus position from a Z-direction variation of focus values according to the embodiment.

In the flowchart of FIG. 7, first, at step ST20, the computer 15 judges whether the focus values of each pixel calculated at the above-described step ST7 and ST12 are focus values of the last pixel of the image data. If it is not focus values of the last pixel, the process goes to step ST21 to start the following process for each pixel.

Figure 8A:
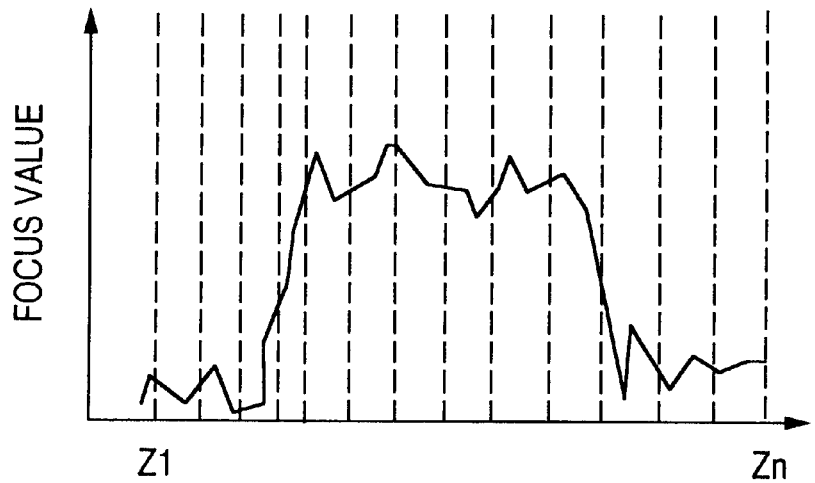
FIGS. 8A and 8B are a graph showing focus values calculated from imaged pictures at respective positions and a graph showing noise-eliminated focus values, respectively, in the testing apparatus of FIG. 1.
Figure 8B:
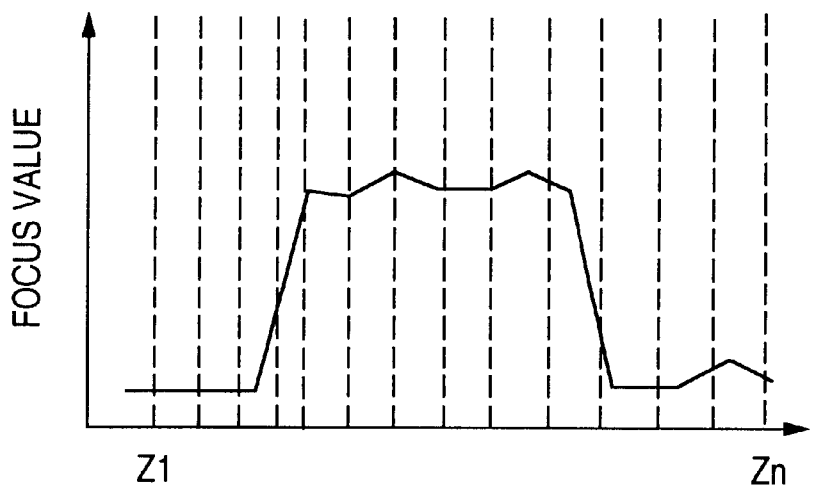
Figure 9A:
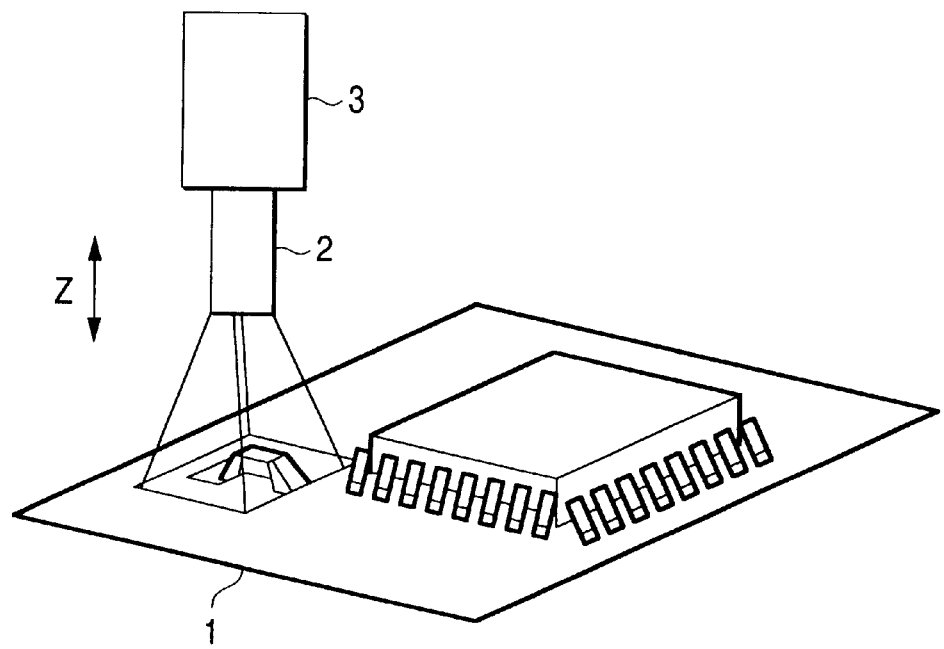
FIGS. 9A and 9B are a schematic perspective view and an imaged picture, respectively, of an example of a conventional testing apparatus.
Figure 9B:
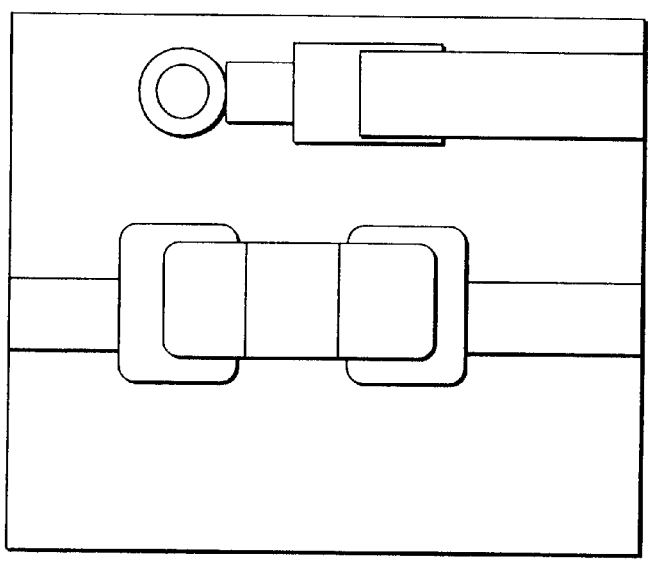
Figure 10A:
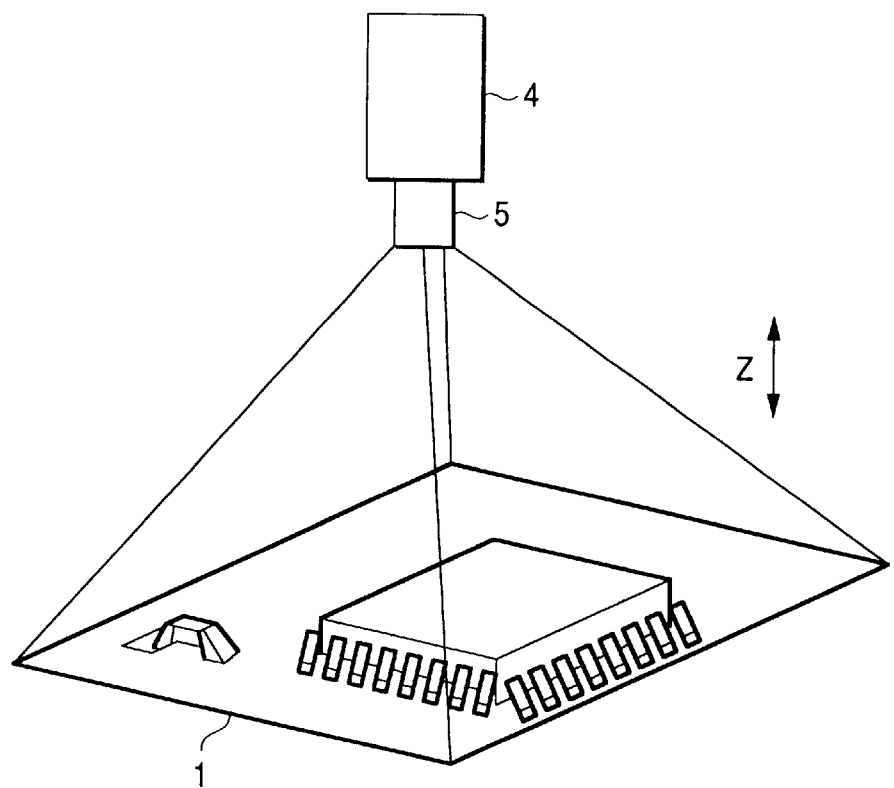
FIGS. 10A and 10B are a schematic perspective view and an imaged picture, respectively, of an example of a conventional testing apparatus using a video camera.
Figure 10B:
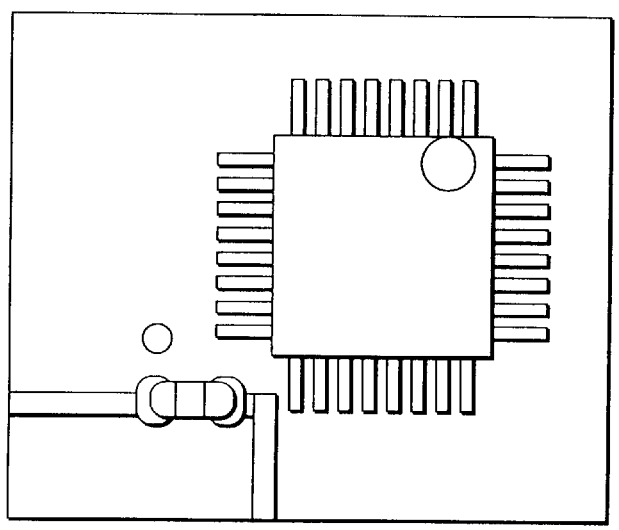

That is, the computer 15 causes the low-pass filter 32 to eliminate waveform noise as shown in FIG. 8B from a waveform of the focus values at the respective positions Z1–Zn shown in FIG. 8A.

Then, the computer 15 calculates a differentiation value of the shaped focus value waveform at a subject position by using values before and it. At step ST22, the computer 15 judges, based on the differentiation values, whether the subject position is a rise position (e.g., the maximum value in the plus direction) of the focus value waveform.

If it is a rise position of the waveform, at step ST23 the computer 15 stores it as a rise point. If the subject position of the waveform is not a rise position, the computer 15 judges at step ST24 whether it is a fall position (e.g., the maximum value in the minus direction) of the focus value waveform.

If it is a fall position of the waveform, at step ST25 the computer 15 stores it as a fall point of the waveform. If the subject position is not a fall position of the waveform, the computer 15 judges at step ST26 whether the subject data is the final data of the waveform.

If it is not the final data of the waveform, the process returns to step ST21 and steps ST21–ST26 are executed again for the next focus value. If the subject data is the last data of the waveform, the process goes to step ST27, where the computer 15 calculates a just focus point as a focus position in the following manner based on the rise point and the fall point of the focus value waveform, reads a height information value corresponding to the just focus point from the input memory 25, and determines a height of the object 11.

In the above process, for example, the just focus point calculation is performed in such a manner that the middle position of the rise point and the fall point is employed as a just focus point.

Another method of the just focus point calculation may be such that several object members whose heights are known are measured by the above-described method and their positional relationships with a rise point and a fall point are determined in advance, and a just focus point is determined from the rise point and the fall point of the height measurement object member based on the positional relationships thus determined.

Further, where the object for imaging is so shaped that its height does not vary to a large extent pixel by pixel, as for a height of the object that is calculated by the just focus point calculation, a more correct height measurement can be performed by eliminating heights that vary greatly pixel by pixel from by using, for example, what is called a median filter that performs processing of employing the middle value of the heights of the subject pixel and a peripheral pixel.

As described above, in this embodiment, in the testing apparatus for performing a shape test on the object 11 based on imaged pictures of the object 11, a height of the object 11 is measured by determining a focus position by calculating focus values based on the imaged pictures. Therefore, it is not necessary to separately provide an instrument for height measurement, and testing and height measurement of the object 11 can be performed simultaneously with a simple configuration.

Although in the above embodiment the imaging means 13 is moved by the moving means 14 in the Z direction with respect to the stage 12 on which the object 11 is placed, the invention is not limited to such a case; satisfactory results can be obtained as long as the imaging means 13 is moved by the moving means 14 in the Z direction relative to the stage 12. For example, the moving means 14 may move the stage 12 in the Z direction with respect to the imaging means 13 that is fixed.

As described above, the invention can provide a height measuring apparatus and method which make it possible to perform height measurement based on imaged pictures of an object member such as an electronic component as well as a testing apparatus which makes it possible, by utilizing such a height measuring apparatus, to perform imaging and height measurement of an object member simultaneously.

What is claimed is:

1. A height measuring apparatus comprising:
   an imaging device that is movable in a Z direction that is perpendicular to an object, for imaging the object;
   an adjustable moving apparatus that moves the imaging means in the Z direction; and
   a controlling device that measures a height of the object by causing the imaging device to image the object at a predetermined number of positions in a Z direction sequentially, while causing the moving apparatus to move the imaging device in the Z direction by a very small distance at a time, wherein when the imaging device images the object it:
   a) acquires a pixel in an image captured at a first predetermined position in the Z direction and determines whether the acquired pixel is a final pixel in said image,
   b) if the acquired pixel is not a final pixel, calculates focus values of the acquired pixel through image processing based on respective imaged pictures, and detects a focus position from a Z-direction variation of the focus values,
   c) if the acquired pixel is a final pixel in said image, it moves to another predetermined position until images are stored from each of said predetermined positions.

2. The height measuring apparatus according to claim 1, wherein the imaging device comprises a lens having a large depth of field.

3. The height measuring apparatus according to claim 1, wherein the focus value is a spatial frequency that is a degree of luminance variation.

4. A testing apparatus comprising: an imaging device that is movable in a Z direction that is perpendicular to an object, for imaging the object;
   an adjustable moving apparatus that moves the imaging means in the Z direction; and
   a controlling device that measures a height of the object by causing the imaging device to image the object at a predetermined number of positions in a Z direction sequentially, while causing the moving apparatus to move the imaging, wherein when the imaging device images the object it:
   a) acquires a pixel in an image captured at a first predetermined position in the Z direction and determines whether the acquired pixel is a final pixel in said image,
   b) if the acquired pixel is not a final pixel, calculates focus values of the acquired pixel through image processing based on respective imaged pictures, and detects a focus position from a Z-direction variation of the focus values,
   c) if the acquired pixel is a final pixel in said image, it moves to another predetermined position until images are stored from each of said predetermined positions, and
   wherein the controlling device further performs a shape test on the object by combining a plurality of imaged pictures of the object.

5. A height measuring method comprising:
   imaging an object sequentially at a first of a predetermined sequence of individual movement positions with an imaging device while moving the imaging device in a Z direction that is perpendicular to the object by a very small distance at a time, wherein said imaging includes acquiring a pixel in an image captured at a first predetermined position in the Z direction and determining whether the acquired pixel is a final pixel in said image;

if the acquired pixel is not a final pixel, calculating focus values of the acquired pixel based on respective imaged pictures taken by the imaging device, and detecting a focus position from a Z-direction variation of the focus values, and employing the focus position as a height of the object; and if the acquired pixel is a final pixel in said image, moving said imaging device to another predetermined position in said sequence until images are stored from each of said predetermined positions in said sequence.

* * * * *